United States Patent
Marks et al.

(10) Patent No.: US 8,300,228 B2
(45) Date of Patent: Oct. 30, 2012

(54) MATCHED PULSE STIMULATED RAMAN SCATTERING

(75) Inventors: Daniel L. Marks, Chapel Hill, NC (US); Joseph B. Geddes, III, Champaign, IL (US); Stephen A. Boppart, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 366 days.

(21) Appl. No.: 12/582,168

(22) Filed: Oct. 20, 2009

(65) Prior Publication Data

US 2010/0208252 A1    Aug. 19, 2010

Related U.S. Application Data

(60) Provisional application No. 61/107,106, filed on Oct. 21, 2008.

(51) Int. Cl.
*G01B 9/02* (2006.01)
(52) U.S. Cl. ........................ 356/451
(58) Field of Classification Search ........... 356/450, 356/451
See application file for complete search history.

(56) References Cited

U.S. PATENT DOCUMENTS

| | | | | |
|---|---|---|---|---|
| 5,486,833 | A * | 1/1996 | Barrett | 342/204 |
| 7,586,618 | B2 | 9/2009 | Marks et al. | 356/451 |
| 7,623,908 | B2 | 11/2009 | Boppart et al. | 600/477 |
| 2002/0167581 | A1 * | 11/2002 | Cordingley et al. | 347/173 |

OTHER PUBLICATIONS

Jones, et al. "*High-spectral-resolution coherent anti-Stokes Raman scattering with interferometrically detected broadband chirped pulses*," Optical Society of America, Optics Letters, vol. 31, No. 10, pp. 1543-1545, May 15, 2006.
Dudovich, et al. "*Single-pulse coherently controlled nonlinear Raman spectroscopy and microscopy*," Nature Publishing Group, Nature, vol. 418, pp. 512-514, Aug. 2002.
Marks, et al. "*Nonlinear Interferometric Vibrational Imaging*," The American Physical Society, Physical Review Letters, vol. 92, No. 12, pp. 123905-1-4, Mar. 26, 2004.
Oron, et al. "*Quantum control of coherent anti-Stokes Raman processes*," The American Physical Society, Physical Review A, vol. 65, pp. 043408-1-4, Apr. 2002.
Oron, et al. "*Narrow-Band Coherent Anti-Stokes Raman Signals from Broad-Band Pulses*," The American Physical Society, Physical Review Letters, vol. 88, No. 6, pp. 063004-1-4, Feb. 11, 2002.

* cited by examiner

*Primary Examiner* — Tarifur Chowdhury
*Assistant Examiner* — Jonathon Cook
(74) *Attorney, Agent, or Firm* — Sunstein Kann Murphy & Timbers LLP (57) ABSTRACT

Methods and apparatus for selectively driving the vibrations of normal modes of a target molecule into coherence using stimulated Raman scattering. In concert, many vibrations produce a larger anti-Stokes signal than a single vibration. The same illumination does not drive other molecules to have coherent vibrations, so these molecules produce a weaker signal. Target and confounder molecules can be distinguished by pulses that drive many vibrations coherently, with applications in coherent Raman microspectroscopy.

20 Claims, 5 Drawing Sheets

MATCHED PULSE STIMULATED RAMAN SCATTERING

The present application claims priority from U.S. Provisional Patent Application 61/107,106, filed Oct. 21, 2008, which is incorporated herein by reference.

This invention was developed with Government support under Grant No. 1R1CA115536, awarded by the National Institutes of Health, National Cancer Institute, and Grant No. 1R01-EB005221, awarded by the National Institutes of Biomedical Imaging and Bioengineering. The Government has certain rights in the invention.

TECHNICAL FIELD OF THE INVENTION

The present invention pertains to methods and apparatus for identifying a target molecular species within a sample, and, more particularly, to target identification by means of coherent excitation, with a short optical pulse, of multiple Raman scattering modes.

BACKGROUND OF THE INVENTION

The spectroscopy of biological tissue is complicated by the highly heterogeneous content of the tissue. This heterogeneity precludes easily identifiable spectral features in any of the visible, infrared, nuclear magnetic resonance, or Raman, spectra.

Nonlinear microscopy has shown promise in unraveling the spectral complexity of biological tissue because of the rich collection of material properties accessible using nonlinear spectroscopy, as well as the excellent confinement of the nonlinear effects to the focus volume in a microscope. Nonlinear microscopy underlies such methods as Coherent anti-Stokes Raman Scattering (CARS) microscopy, described by
Duncan et al., *Opt. Lett.*, 7, p. 350 (1982), and
Cheng et al., *J. Opt. Soc. Am. A*, 19, p. 1363 (2002);
Nonlinear Interferometric Vibrational Imaging (NIVI), described by
Marks et al., *Phys. Rev. Lett.*, 92, 123905 (2004),
Jones et al., *Opt. Lett.*, 31, p. 1543 (2006),
Marks et al., *Appl. Phys. Lett.*, 85, p. 5787 (2004), and
Bredfeldt et al., *Opt. Lett.*, 30, p. 495 (2005);
two-photon microscopy, described by
Denk et al., *Science*, 243, p. 73 (1990), and
Helmchen et al., *Nature Methods*, 2, p. 932 (2005);
second harmonic generation microscopy, described by
Vinegoni et al., *Opt. Expr.*, 12, p. 331 (2004),
Yazdanfar et al., *Opt. Expr.*, 12, p. 2739 (2004), and
Campagnola et al., *Biophys. J.*, 77, p. 3341 (1999).

Each of the above methods has demonstrated the potential of nonlinear microscopy to revolutionize our understanding of biological tissues on the sub-$\mu$m scale, and all of the aforesaid references are incorporated herein by reference.

In particular, Raman scattering methods probe the vibrational frequencies of molecular normal modes, and the Raman spectrum of a particular molecule is highly specific to the molecule. Unfortunately, many molecules can share the same vibrational frequencies, so that it may be difficult to distinguish molecules based on measurements at a small number of vibrational frequencies.

Dudovich et al., *Single-pulse coherently controlled nonlinear Raman spectroscopy and microscopy*, Nature, 418, pp. 512-14 (2002) teach that, for materials having more than one vibrational level, "it is possible to improve detection selectivity by tailoring shaped pulses to induce quantum interference [between these excited] levels." They show (in FIG. 2c) a beat induced between two modes of Raman-excited dichloromomethane. However, no teaching is provided as to how coherence may be provided, systematically or otherwise, among multiple modes of a target species.

SUMMARY OF THE INVENTION

In accordance with preferred embodiments of the present invention, a method is provided for identifying the presence of a target molecular species in a sample, where the molecular species is characterized by a plurality of vibrational modes and a Raman impulse response. The method has steps of:
a. defining at least one feature of an exciting electromagnetic pulse on a basis of features of the Raman impulse response of the target species;
b. exciting the sample with the electromagnetic pulse;
c. generating coherent stimulated scattered radiation;
d. interfering the coherent stimulated radiation with a reference pulse so as to cross-correlate the coherent stimulated radiation and the reference pulse, the reference pulse characterized by a relative timing with respect to the exciting electromagnetic radiation;
e. sweeping the delay time so as to measure a correlation trace; and
f. determining the presence of the target species based at least on a specified criterion applied to the correlation trace.

In accordance with further embodiments of the present invention, the reference pulse may be derived from the exciting electromagnetic pulse, or otherwise. The step of defining at least one feature of the exciting electromagnetic pulse may includes defining a temporal aspect of the pulse, shaping an envelope of the pulse, defining an envelope amplitude aspect of the pulse, defining an envelope phase aspect of the pulse, or defining a spectral aspect of the pulse. The step of defining at least one feature of the exciting electromagnetic pulse, in particular, may include shaping the pulse in time to approximate a time-reversal of the Raman impulse response of the target species.

In further embodiments, the coherent stimulated scattering may be Stokes or anti-Stokes Raman scattering. The exciting electromagnetic pulse may be shaped to approximate a time-reversal of the Raman impulse response of the target species. There may be a further step of calibrating the correlation trace with respect to the target species. The step of interfering the anti-Stokes scattered radiation with the reference beam may further comprise filtering excitation wavelengths from at least one of the scattered radiation and the reference beam.

In yet further embodiments of the invention, the step of shaping may include a successive iteration process to achieve an intensity profile positive-definite in time, or may include using a reference target sample to define the shape of the exciting electromagnetic pulse without an iterative algorithm. Moreover, the reference target sample may be provided in an environment corresponding to that of the sample. The reference pulse may be shaped for selectively enhancing a correlation with scatter of the target species.

In other embodiments of the invention, scatterers may be introduced into the sample to enhance field intensities with respect to the target species. The scatterers may include nanoparticles such as gold nanoparticles.

In another aspect of the present invention, an apparatus is provided for identifying the presence of a target molecular species in a sample. The apparatus has a source of ultrashort electromagnetic pulses and a pulse shaper for shaping pulses generated by the source in a manner exhibiting target species specificity. The apparatus also has an interferometer for interfering pulses traversing a sample with reference pulses traversing a reference path and at least one detector for detecting a combination of pulses traversing the sample with reference pulses traversing the reference path. Finally, the apparatus has a correlator for determining the presence of the target species based at least on a specified criterion applied to a correlation trace.

In accordance with another aspect of the present invention, a computer program product is provided for use on a computer system for defining either an excitation, or a reference, pulse, or both, for identifying presence of a specified target molecular species. The computer program product has a computer usable medium having computer readable program code thereon, and includes:

a. program code for defining at least one feature of an electromagnetic pulse on a basis of features of the Raman impulse response of the target species; and b. program code for determining the presence of the target species based at least on specified criteria applied to a correlation trace between radiation scattered by a sample and a reference beam.

A further aspect of the present invention provides a library of a plurality of molecule-specific electromagnetic pulse profiles, each profile designed to selectively enhance a correlation signal derived when an excitation pulse is applied to a sample containing a target molecular species and interfered with a reference pulse, wherein at least one of the excitation pulse and the reference pulse is shaped in accordance with one molecule-specific electromagnetic pulse profile of the library.

And yet another aspect of the present invention provides methods for constructing a library of a plurality of molecule-specific electromagnetic pulse profiles. Those methods include defining at least one feature of either an exciting electromagnetic pulse or a reference pulse corresponding to each of a plurality of target molecules on a basis of features of the Raman impulse response of the respective target molecules. More particularly, the exciting electromagnetic pulse is shaped to approximate a time-reversal of the Raman impulse response of the target species.

DESCRIPTION OF THE FIGURES

The foregoing features of the invention will be more readily understood by reference to the following detailed description, taken with reference to the accompanying drawings, in which:

FIGS. 2A-2F show results of a simulation of matched pulse Raman excitation. In FIGS. 2D-F, curve 20 is of the target molecule, curve 24 is of confounder A, and curve 22 is of confounder B.

DESCRIPTION OF SPECIFIC EMBODIMENTS OF THE INVENTION

For addressing highly complex spectra, and as an alternative to the non-linear spectroscopic methods enumerated in the Background of the Invention section above, it is preferable, in accordance with the present invention, to engineer electromagnetic radiation that produces an identifiable signal selectively from molecules of interest, while minimizing or rejecting signals from other molecules. In accordance with the present invention, methods are described for designing an excitation pulse that generates a large signal from a particular molecule while reducing the signal generated from other molecules that may be similar in many regards. This is done by creating an electromagnetic pulse that, through stimulated Raman scattering, maximizes the coherence between vibrations of normal modes in the target molecule. This coherence allows these vibrations to radiate anti-Stokes Raman radiation constructively, producing a larger and more specific signal than would be generated by a single vibration.

The present invention novelly provides systematic and readily implemented methods for ensuring additive coherence among an arbitrarily large number of modes of a target species, or, for that matter, one or more of a library of target species. Moreover, the present invention teaches how discrimination may be optimized for detection of a target species against a background of one or more confounding species. The methods of the present invention are also applicable to other non-linear processes.

In the present description and in any appended claims, the word "approximate" will be used functionally, i.e., it denotes a degree required to meet discrimination criteria appropriate for a specified application.

To understand how the coherence of stimulated modes is achieved in accordance with embodiments of the invention, the equations governing the CARS process for a point scatterer are considered, as discussed, for example, by Oron et al., *Narrow-Band Coherent Anti-Stokes Raman Signals from Broad-Band Pulses*, Phys. Rev. Lett., 88, 063004 (2002) and Oron et al., *Quantum control of coherent anti-Stokes Raman processes*, Phys. Rev. A, 65, 043408 (2002), both of which references are incorporated herein by reference. It is to be understood, moreover, that the principles taught herein apply to other non-linear processes that invoke higher-order susceptibilities of the probed medium, and that the present invention is described herein in terms of anti-Stokes Raman scattering purely as a matter of heuristic convenience and not by way of limitation. Moreover, while the scatterer is described as a point scatterer, that, too, is a matter of heuristic simplification, and it is to be understood that the invention may be practiced with respect to samples characterized by finite volumes, as are all practical samples.

At the position of a scatterer, the time-varying incident electric field is given by E(t), and is assumed, for heuristic purposes, to contain no frequencies directly resonant with the scatterer medium. The corresponding spectrum for the complex analytic signal of E(t) is given by $\tilde{E}(\omega)$ such that $$E(t) = \pi^{-1} \text{Re}\left\{ \int_0^\infty d\omega \exp(i\omega t) \tilde{E}(\omega) \right\}.$$

The Raman susceptibility of the scatterer is described by $\tilde{\chi}^{(3)}(\Omega)$, where $\Omega$ is a vibrational frequency. The anti-Stokes polarization $\tilde{P}^{(3)}(\omega)$ produced in the scatterer is then given by the equations $$\tilde{Q}(\Omega) = \tilde{\chi}^{(3)}(\Omega) \int_0^\infty \tilde{E}(\omega + \Omega)\tilde{E}(\omega)^* d\omega \text{(step 1)} \quad (1)$$

$$\tilde{P}^{(3)}(\omega) = \int_0^\omega \tilde{E}(\omega - \Omega)\tilde{Q}(\Omega) d\Omega \text{(step 2)}. \quad (2)$$

The foregoing formulation additionally assumes that the normal modes are uncoupled, which is valid for weak excitation of the modes. The scope of the present invention, as described herein and as claimed in any appended claims, is not limited by the foregoing assumption. The CARS process can be understood as involving two stimulated Raman scattering processes. The first process, represented by Eq. 1, induces oscillations with total amplitude $\tilde{Q}(\Omega)$ at vibrational frequencies $\Omega$ into the medium. The second process of Eq. 2 describes the anti-Stokes polarization $\tilde{P}^{(3)}(\omega)$ resulting from the mixing of the excitation field and the medium polarization. If we define the time-domain functions $$Q(t) = \pi^{-1} \text{Re}\left\{ \int_0^\infty d\Omega \exp(i\Omega t)\tilde{Q}(\Omega) \right\} \text{ and}$$

$$\chi^{(3)}(t) = \pi^{-1} \text{Re}\left\{ \int_0^\infty d\Omega \exp(i\Omega t)\tilde{\chi}^{(3)}(\Omega) \right\},$$

Eq. 1 is expressed in the time domain as $$Q(t) = \int_{-\infty}^\infty dt' |E(t-t')|^2 \chi^{(3)}(t') \quad (3)$$

This equation can be understood as a convolution of the amplitude squared of the electric field $|E(t)|^2$ and a Raman impulse response $\chi^{(3)}(t)$. An example of this process is given by a typical Raman scattering experiment in which the medium is illuminated by two monochromatic waves such that $E(t) = E_0 \cos(\omega_1 t) + E_0 \cos(\omega_2 t)$. This field excites the oscillation $Q(t)$ such that $$Q(t) = \frac{E_0^2}{2} \text{Re}\{\tilde{\chi}^{(3)}(\Omega)\exp(i\Omega t)\}$$

and the vibrational frequency $\Omega = |\omega_1 - \omega_2|$ is probed.

Instead of the foregoing simple scheme, the present invention, in one embodiment, teaches illuminating the scatterer with a matched pulse such that $|E(t)|^2 = C[K + \chi^{(3)}(-t)]$, where the constant $K = \max(-\chi^{(3)}(t))$ over all t to ensure the positivity of $|E(t)|^2$. This field is shaped such that the field envelope resembles the time-reversed Raman impulse response. Time reversal refers to the relation between two functions, f(t) and g(t), such that f(t)=g(-t). In this case, $$Q(t) = CK\tilde{\chi}^{(3)}(0) + C \int_{-\infty}^\infty dt' \chi^{(3)}(t')\chi^{(3)}(t+t').$$

Aside from the constant term, the total oscillation amplitude $Q(t)$ is proportional to the autocorrelation of $\chi^{(3)}(t)$. This autocorrelation takes on a maximum value at $t=0$ when all of the vibrational frequencies $\Omega$ are excited in phase. Because the normal modes constructively interfere, the anti-Stokes radiation generated at $t=0$ is stronger than that produced by a single normal mode alone, and allows a much larger signal to be generated from the molecule. At the same time, other molecules with different Raman impulse responses do not have their normal modes in phase at $t=0$, and therefore a correspondingly weaker anti-Stokes signal is generated. Therefore by shaping the incident electric field E(t) to have an envelope $|E(t)|^2$ given by the time-reversed Raman impulse response, the response of the molecule can be "matched" and the greatest magnitude signal can be produced from it.

This "matched pulse" idea derives from a similar concept in communications theory, the matched filter, discussed, for example, in Blahut, *Theory of Remote Image Formation*, (Cambridge U. Press, 2004), which is incorporated herein by reference. As in the case of a matched filter, Eq. 3 is a linear, time-invariant system driven by the envelope of the field $|E(t)|^2$. The effect of communication lines on conveyed signals is likewise modeled as linear and time-invariant. By driving a pulse-distorting transmission line with its time-reversed impulse response, the autocorrelation of the impulse response is received at the distal end. The sharp peak at the center of the autocorrelation is easier to separate from noise. It is this property of the matched filter that also makes it useful as a means of generating large anti-Stokes signals from molecules, even though the field envelope can only approximate the true Raman impulse response.

In accordance with a preferred embodiment of the present invention, a pulse E(t) is designed with a given amplitude envelope A(t) such that $|E(t)|^2 = C A(t)$, with C being a scaling constant. We assume that $A(t) \geq 0$ for $-t_m \leq t \leq 0$ and $A(t) = 0$ otherwise, where $t_m$ is the maximum delay that can be controlled by the pulse shaping apparatus. In addition, it is required that $|\tilde{E}(\omega)| \leq E_A(\omega)$, where $E_A(\omega) \geq 0$. This constraint assumes the source is bandlimited and the pulse shaping mechanism is only able to alter the phase and attenuate frequencies in the source signal. Of course, the scope of the invention is not so limited, and other embodiments may entail pulse shaping in a more general sense. Because these are nonlinear constraints, methods such as linear programming do not suffice to find a suitable E(t). Therefore, in accordance with certain embodiments of the invention, the following iterative method may be employed, for example, to find successive electric-field iterations $\tilde{E}^{(n)}(\omega)$ that produces satisfactory pulse shapes.

The steps of this exemplary iterative method are

1. Start with a random guess for $\tilde{E}^{(0)}(\omega)$ such that $|\tilde{E}^{(0)}(\omega)| = E_A(\omega)$ but has a random phase.

2. Transform to the time domain such that $$E^{(n)}(t) = (2\pi)^{-1} \int_0^\infty d\omega \exp(i\omega t)\tilde{E}^{(n-1)}(\omega).$$

3. Enforce the time-domain amplitude constraint by computing $$\hat{E}^{(n)}(t) = (1-\alpha)E^{(n)}(t) + \alpha\sqrt{A(t)}\frac{E^{(n)}(t)}{|E^{(n)}(t)|}\sqrt{\frac{\int_{-\infty}^{\infty}dt'|E^{(n)}(t')|^2}{\int_{-\infty}^{\infty}dt'|A(t')|}}$$

with $0<\alpha<1$ being a relaxation constant to stabilize the iterations.

4. Transform back to the frequency domain such that $$\hat{\tilde{E}}^{(n)}(\omega) = \int_{-\infty}^{\infty}dt\exp(-i\omega t)\hat{E}^{(n)}(t).$$

5. Enforce the constraint $|\tilde{E}(\omega)|<E_A(\omega)$ by computing $$\tilde{\epsilon}^{(n)}(\omega) = \frac{\hat{\tilde{E}}^{(n)}(\omega)E_A(\omega)}{|\hat{\tilde{E}}^{(n)}(\omega)|}$$

for $|\hat{\tilde{E}}^{(n)}(\omega)|>E_A(\omega)$ and $\tilde{\epsilon}^{(n)}(\omega)=\hat{\tilde{E}}^{(n)}(\omega)$ otherwise.

6. Relax the iteration by setting $\tilde{E}^{(n)}(\omega)=(1-\beta)\tilde{E}^{(n-1)}(\omega)$ $\alpha\beta\tilde{\epsilon}^{(n)}(\omega)$ for $0<\beta<1$.

7. Continue at step 2 until the iterations produce insignificant changes to $\tilde{E}^{(n)}(\omega)$ between iterations.

Implemented on a digital computer, the representations of E(t) and $\tilde{E}(\omega)$ are most likely discretely sampled in time and frequency and therefore the Fourier integrals can be implemented using the Fast Fourier Transform. In an exemplary implementation of the method, the choice of the relaxation constants $\alpha=0.4$ and $\beta=0.2$ appears to ensure reliable convergence.

The simple and obvious choice for A(t) would seem to be $A(t)=E_0^2[K+\chi^{(3)}(-t)]$, with K chosen as above to ensure the positivity (or positive-definiteness) of A(t), since the intensity of the excitation pulse necessarily assumes a non-negative value at all times. Unfortunately, in practice K is so large that most of the pulse energy is then unavailable to generate the desired molecule-specific Raman signal, because the desired pulse envelope is superimposed on a large background signal. Rather, an approximation to the true time-reversed impulse response may be chosen that more efficiently utilizes the available source energy:

$$W(t) = \sqrt{\frac{\gamma^2}{\omega}\int_{t-\omega/2}^{t+\omega/2}dt'|\chi^{(3)}(t')|^2} \text{ so that} \quad (4)$$

$$A'(t) = E_0^2[\chi^{(3)}(t) + W(t)] \text{ where} \quad (5)$$

$$A(t) = A'(-t) \text{ for } A'(-t) > 0 \text{ and } -t_m \leq t \leq 0 \text{ and} \quad (6)$$

$$A(t) = 0 \text{ otherwise.} \quad (7)$$

Rather than requiring that the entire envelope A'(t) be positive, a slowly-varying amplitude W(t) may be added to the impulse response to make most of the values of A'(t) positive. A window of size $\omega>0$ is used to find the average deviation of the Raman impulse response over many oscillations of the impulse response. This deviation is then added to the original Raman impulse response to raise most of the samples of A(t) above zero. The constant $\gamma$ is chosen to trade off fidelity of the impulse response with efficiency at exciting the target molecule. This pulse design better utilizes the available source energy at the expense of causing very low-frequency Raman vibrations to become excited, which somewhat reduces the selectivity.

It is to be understood that, within the scope of the present invention, the pulse design obtained by means of the foregoing algorithm, or otherwise, need not result either in maximizing a signal from the molecule of interest, nor for discriminating among many molecules. Rather, the tailoring of a suitable excitation pulse is a design process, enabled through the teachings of the current invention, in which various considerations may be weighed. The teachings herein provide the essential considerations to allow generating a substantially coherent response in the molecule of interest.

Figure 1A:
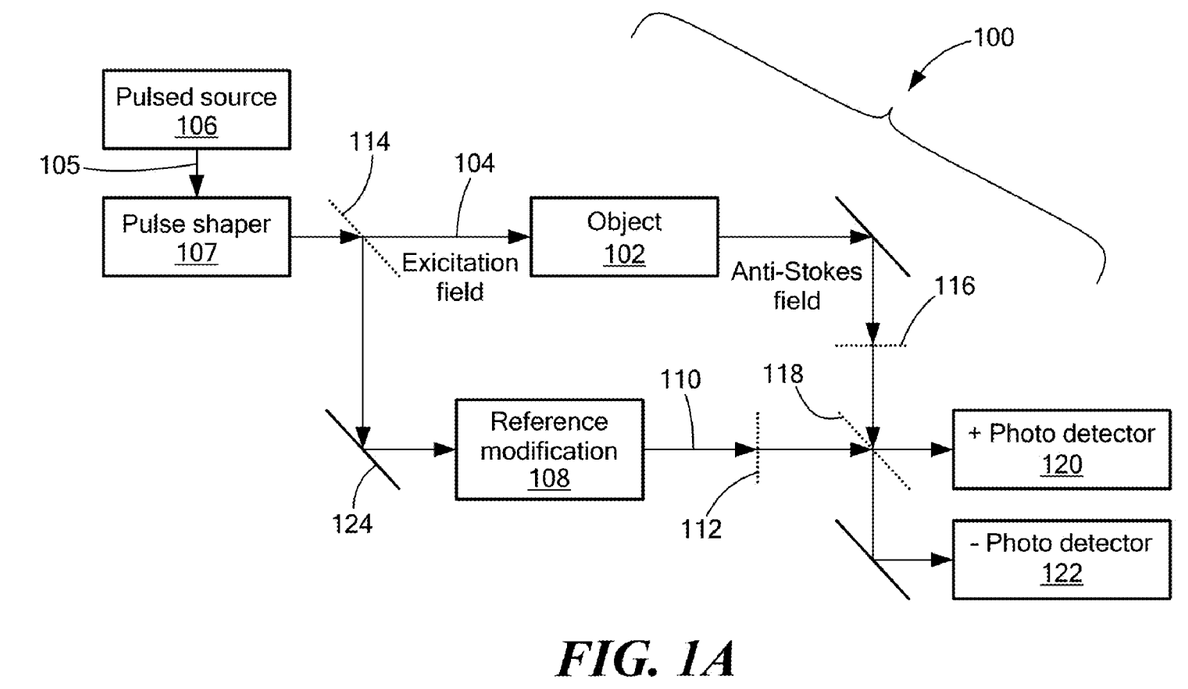
FIG. 1A is a schematic depiction of a matched-filter Raman imaging instrument which implements matched-filter Raman spectroscopy methods in accordance with one embodiment of the present invention.

An instrument utilizing matched-filter Raman spectroscopy works is now described with reference to the embodiment of the present invention depicted schematically in FIG. 1A. A CARS microscope, designated generally by numeral 100, is configured as a Mach-Zehnder interferometer with a Raman scattering medium 102, otherwise referred to herein as an "object" or "sample," generating anti-Stokes radiation in a first arm 104 of the interferometer. It is to be understood that other interferometric configurations are similarly within the scope of the present invention.

Excitation is provided by a pulsed source 106, typically a mode locked laser oscillator, an amplified mode locked laser oscillator, or a cavity-dumped mode locked laser oscillator. Currently the most common for generation of ultrashort pulses is a Ti:sapphire (800 nm) oscillator, but others such as Erbium (1550 nm) or Ytterbium (1060 nm) fiber lasers, or Neodymium YAG (1060 nm) or Neodymium glass lasers can also be used. The laser source may produce sufficient bandwidth in itself, e.g. sources available from Femtolasers (Vienna, Austria) or KMLabs (Boulder, Colo.). The bandwidth can also be broadened by propagation of the intense radiation through an optical fiber, e.g., ultrahigh numerical aperture fiber from Nufern (East Granby, Conn.), photonic crystal fiber from Crystal Fibre (Birkerod, Denmark), or, with sufficient pulse power, standard telecommunications fiber such as Corning SMF-28. In these fibers, self-phase-modulation among other effects can result in supercontinuum generation. The source should be compressible to a near transform-limited pulse, which is to say that a sufficiently deterministic relationship exists between frequency components in the pulse. Near-infrared radiation (NIR) is preferred due to its deep penetration into biological tissues compared to visible, ultraviolet, or other infrared radiation.

The bandwidth of the pulsed illumination includes both the excitation wavelengths of the Raman-active medium and the anti-Stokes wavelengths created by the medium. The excitation wavelengths are shaped by pulse shaper 107 to form an excitation pulse with a spectrum $\tilde{E}(\omega)$, while, at the same time, the anti-Stokes wavelengths produced by the pulsed source 106 may be shaped, by pulse shaper 107 or otherwise, to be the reference field that is interfered with the anti-Stokes radiation scattered by the medium. Therefore, the bandwidth of the laser must be at least as large as the highest frequency vibration to be excited in the sample 102, and is preferably at least 25% larger to ensure one can obtain strong excitation of all the desired vibrations. The typical range of vibrational frequencies that will be stimulated is typically between 600 to 1600 $cm^{-1}$. Lower frequencies than 600 $cm^{-1}$ may be inadvertently excited by distortions in the pulse due to the pulse offset W(t), and the Raman fingerprint region has few frequencies above 1600 $cm^{-1}$ that are of interest. Only a very small amount of reference signal is needed because its magnitude need only be comparable to the amount of anti-Stokes power obtained from the sample. Within the scope of the present invention, the reference signal may be derived from the oscillator 106 itself, if the source bandwidth is large enough, or, alternatively, it may be generated with non-resonant nonlinear processes such as self-phase-modulation or four-wave-mixing in materials such as sapphire, barium fluoride, or silica optical fiber. Such modification of the reference pulse is subsumed within an element referred to schematically in FIG. 1A as Reference Modification 108. A dichroic beam splitter 114 separates the excitation field and the reference field. The spectrum of reference field 110 is given by $\tilde{R}(\omega)$. The reference pulse may be delayed, using standard techniques, by a time $\Delta t$ relative to the anti-Stokes radiation. Reference field 110 is preferably filtered by a high pass filter 112.

Pulse shaping, as used herein, encompasses tailoring temporal aspects of an optical pulse, including, in particular, the envelope of the pulse. Thus, definition of how the amplitude and/or phase of a pulse evolve in time may constitute pulse shaping. Additionally or in the alternative, pulse shaping may include defining the spectral content of the pulse, and, more particularly, the phase relationship among different spectral components of the pulse.

To shape the pulse, any one, or a combination, of spatial light modulator based techniques can be used, such as Fourier-plane pulse shaping with a liquidcrystal spatial light modulator (SLM) or an acousto-optic modulator (AOM). A longitudinal pulse shaper such as the Dazzler™ acousto-optic programmable dispersive filter supplied by Fastlight of Paris, France, can also be used with some pulsed sources and offers convenience and compactness. The typical dephasing time of vibrational modes in liquid water at room temperature is 3-10 ps, so the pulse shaper should be designed to shape pulses of at least 1 ps in duration, but longer than 10 ps is usually not necessary.

The Raman medium contained within sample 102, is characterized by a susceptibility $\chi^{(3)}(\Omega)$, and oscillates with an anti-Stokes polarization $\tilde{P}^{(3)}(\omega)$ in response to the incoming field $\tilde{E}(\omega)$ 104 as per Eqs. 1 and 2. A high-pass filter 116 separates the medium anti-Stokes frequencies and the excitation. At a second beam splitter 118, the reference field and the anti-Stokes field are combined, and the power of the interfered beams is detected by two dual-balanced photodetectors 120,122. The difference in intensity $\Delta I(\Delta t)$ captured by the two photodetectors is given by $$\Delta I(\Delta t) = 4\text{Re}\left\{ \int_0^\infty d\omega \tilde{R}(\omega)\tilde{P}^{(3)}(\omega)^* \exp(-i\omega\Delta t) \right\} \quad (8)$$

By changing the delay $\Delta t$, the cross-correlation between the reference and anti-Stokes fields is measured at the photodetectors. Standard means may be employed to vary, sweep, or dither the delay $\Delta t$ between the interfered beams. If the reference field is chosen such that $\tilde{R}(\omega)=R_0\tilde{P}^{(3)}(\omega)$, where $R_0$ is a proportionality constant, then the measured interference signal is the autocorrelation of the anti-Stokes field, which has its peak at $\Delta t=0$. This suggests that by shaping the reference field to be identical to the signal that is expected to be produced by a target molecule, the interference process itself becomes a matched filter for the signal produced by the molecule. By dithering the delay about $\Delta t=0$, such as by modulating the position of mirror 124, for example, the component of the anti-Stokes signal that is matched to the molecule's signal is measured.

The photodetectors 120, 122 can be photodiodes, avalanche photodiodes, photomultiplier tubes, charged coupled sensor arrays, or other suitable intensity or photon counting measurement instruments. Spectral interferometric detection (as described by Jones et al., (2006), and in references cited therein, may be useful in conjuction with photodetectors as a diagnostic tool or to measure complete Raman spectra using the NIVI technique in the same instrument, as integration of the NIVI technique and the matched pulse technique can be readily achieved in a single instrument by incorporating both time and spectral domain detection. In fact, NIVI can be used to measure the Raman impulse response, so that the combination of NIVI and the matched pulse method in a single instrument enables the molecule Raman impulse response to be characterized with NIVI so that a matched pulse can be devised which is then used to identify the molecule in an unknown sample.

By shaping both the excitation fields and the reference fields, this instrument implements a double matched filter, with selectivity in both the excitation process and the detection process. The signal indicating the presence of the molecule is greatest in the interference signal at a single delay. Therefore by dithering the delay, a medium can be scanned very rapidly for the molecular species because only one sample need be measured from each point in the medium.

Figure 1B:
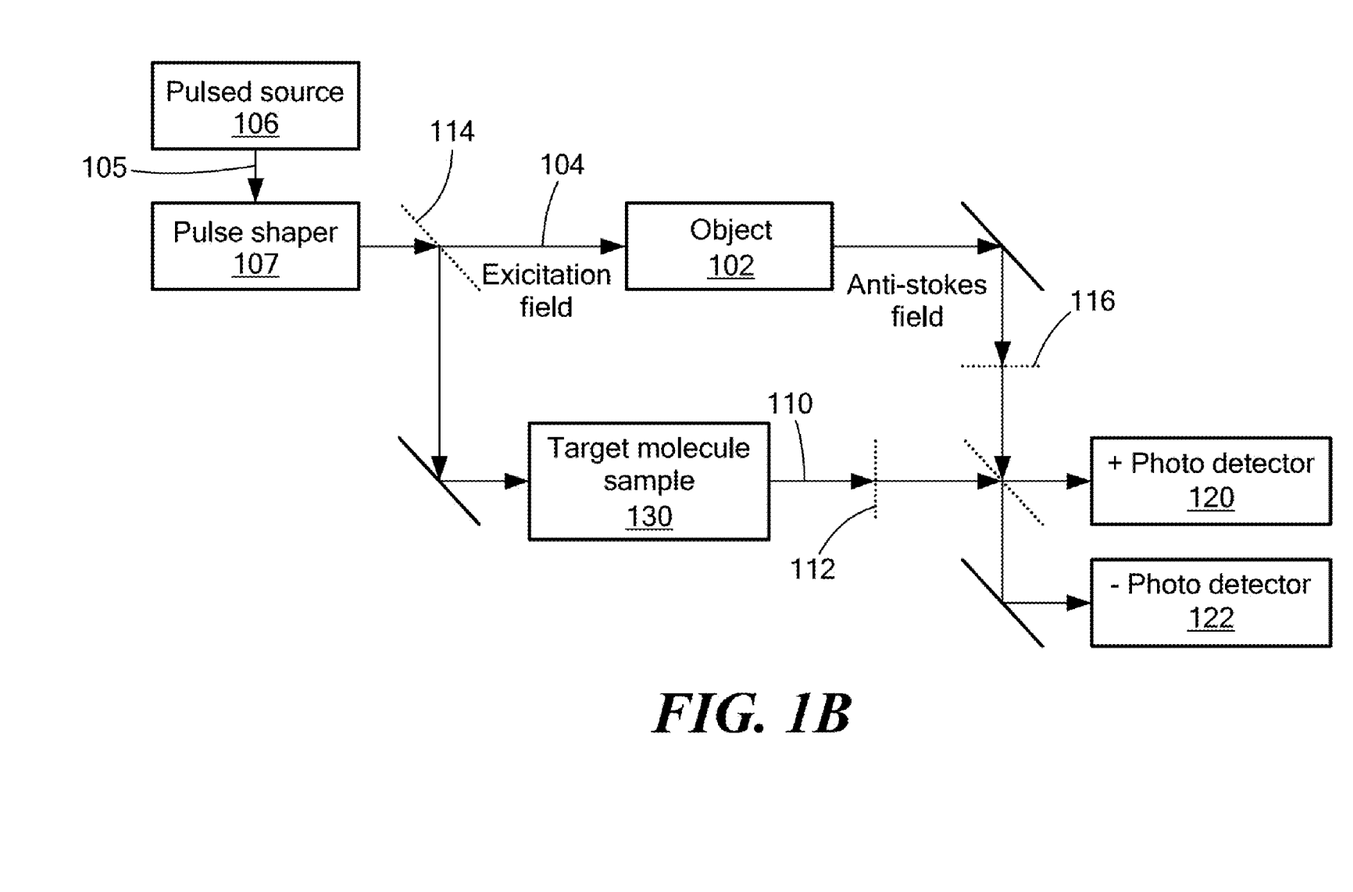
FIG. 1B is a schematic depiction of a matched-filter Raman imaging instrument with a target molecule sample in the reference path in accordance another embodiment of the present invention.

In accordance with a further facet of the present invention, reference field 110 may be derived other than from the same pulse as used to excite stimulated emission. The reference pulse is characterized by a relative timing with respect to the exciting electromagnetic radiation, and that relative timing may be varied by standard means either of pulse generation and shaping or by optical delay. Variation of the relative timing between the excitation pulse and the reference pulse may include periodic sweeping of the relative timing. Instead of being derived from the source 106 or from non-resonant nonlinear processes, reference field 110 can be generated by the target molecule itself, as is shown in FIG. 1B. As has been discussed with reference to the embodiment of FIG. 1A, oscillator radiation 105 from source 106 is shaped to produce the matched pulse excitation 104. However, this excitation excites both an object to be imaged, and a sample 130 of the target molecule in the reference arm. Because the target molecule is used to generate the reference signal, it is ensured that the signal produced by it will match the same target molecule in the object 102. Therefore no pulse shaping is needed to produce the matched reference field to the target molecule. The advantage that the reference field generated by the target molecule sample is always matched to the field generated by the same molecule in the object counteracts a decrement in power available in the anti-Stokes signal produced as a reference signal, relative to the reference signal that may be produced by directly shaping a portion of the pulse delivered by pulse source 106.

Preferably, the target sample 130 is contained within the same environment, whether aqueous or that of another solvent, since the environment may influence the Raman modes of the target.

If a target molecular sample 130 is used to define the reference field, as shown in the embodiment of FIG. 1B, the target molecule sample may be physically exchanged for a new sample if a different molecule is targeted. If a pulse shaper is used, the reference field can be electronically adjusted. This allows for the development of one or more libraries of target molecules, either in physical form, for insertion into the reference path, or in software, to be selected for shaping of the excitation and/or reference pulses. The library of target species may also take potential confounding species into account, such that the exciting an/or references pulses are optimized for detection of a specified target in the presence of one or more expected confounders.

The efficacy of techniques in accordance with the present invention at identifying molecules has been demonstrated by simulation. A target molecule was selected with a Raman spectrum consisting of four equal-magnitude Lorentzian lines at 700, 1000, 1250, and 1450 cm$^{-1}$, each with a 10 cm$^{-1}$ resonance width. The simulated pulsed source had a Gaussian spectrum with a center frequency of 12500 cm$^{-1}$ and a full-width-half-maximum bandwidth of 1800 cm$^{-1}$. The susceptibility $\chi^{(3)}(t)$ and the envelope $A(t)$ were computed for the target using the method of Eqs. 4 to 7, with an averaging window size w=300 fs, γ=2.0, and a maximum pulse time of $t_m$=2000 fs. A starting pulse $\tilde{E}(\omega)$ was computed using 100 iterations of the proposed iterative method. The expected oscillation amplitude $Q(t)$ and anti-Stokes signal were computed using Eqs. 1 and 2. The simulated anti-Stokes high pass filter rejected frequencies less than 14000 cm$^{-1}$.

In addition to the target, two confounding molecules were also simulated. Confounder A (CA) had frequencies of 900, 1100, and 1350 cm$^{-1}$ each of 10 cm$^{-1}$ width, none of which are in common with the target. Confounder B (CB) had frequencies of 800, 1000, and 1450 cm$^{-1}$ each of 10 cm$^{-1}$ width, two of which are in common with the target.

Figure 2A:
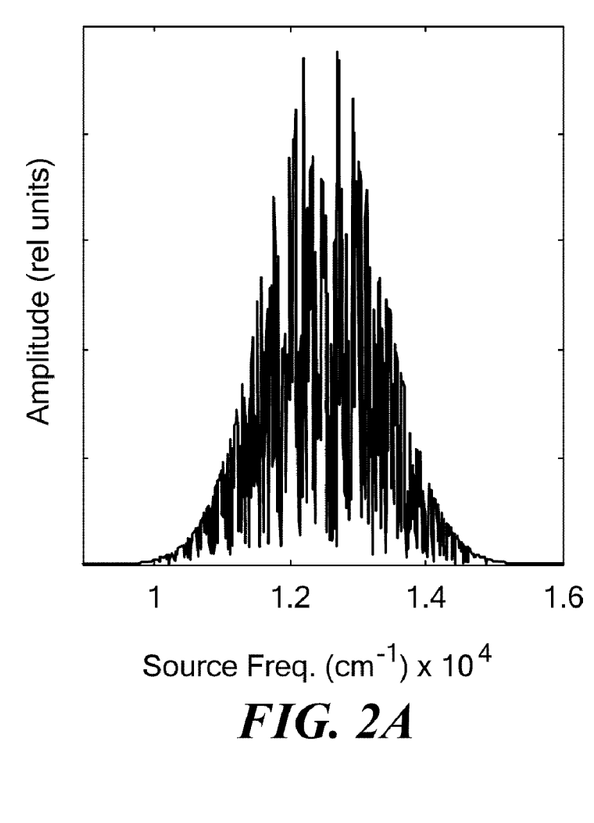
FIG. 2A is the spectrum of the shaped pulse.
Figure 2B:
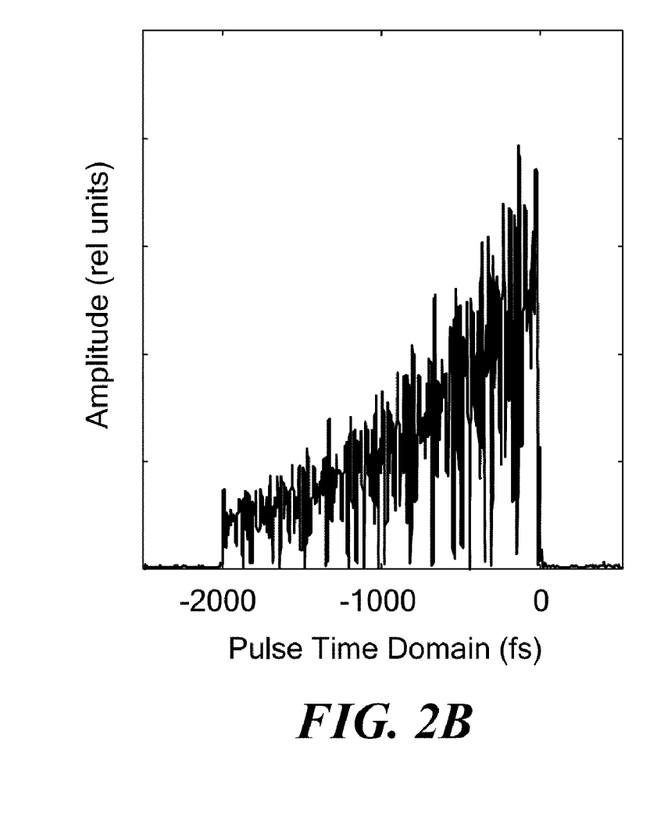
FIG. 2B is the magnitude in the time domain of the shaped pulse.
Figure 2C:
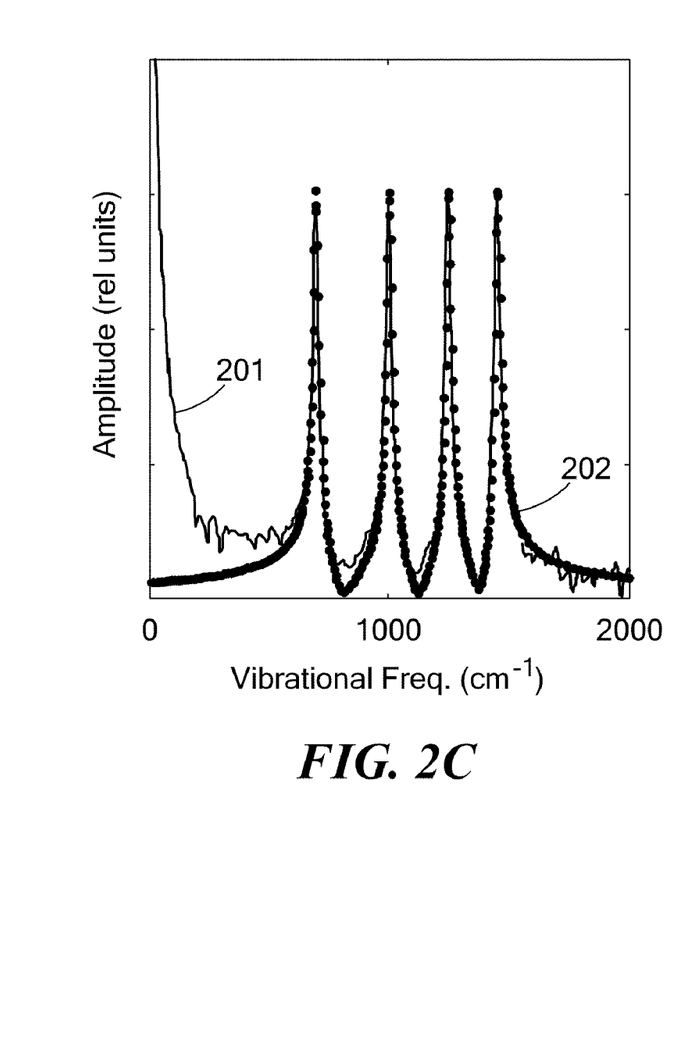
FIG. 2C shows the magnitude of the Raman spectrum 202 of the molecule, and the achieved spectrum 201 derived by the iterative method.
Figure 2D:
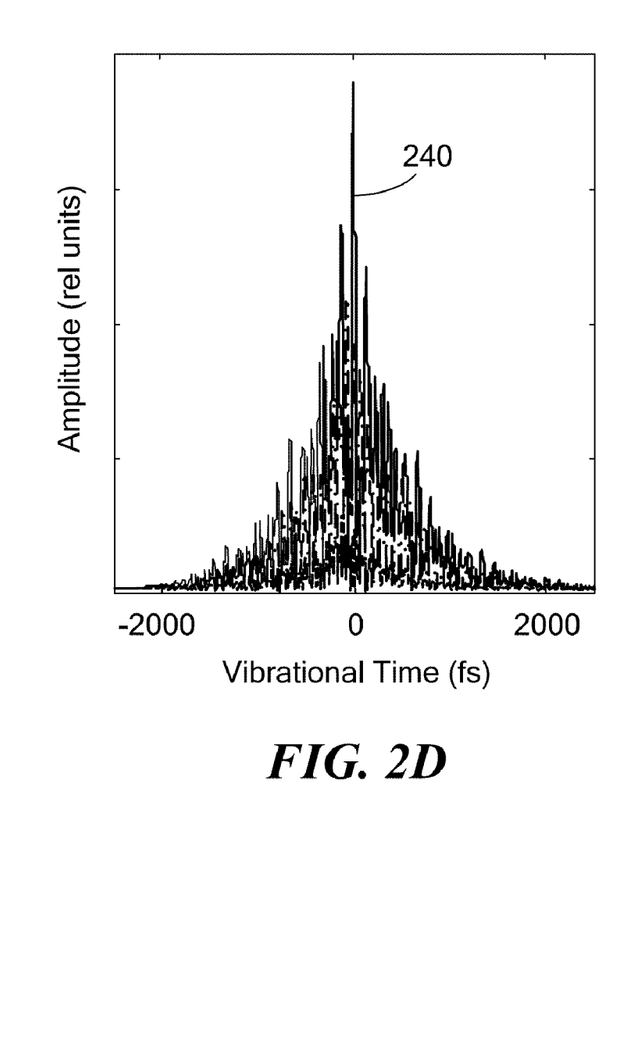
FIG. 2D is the amplitude of the induced total vibrational oscillation of each of the target and two confounding molecules.
Figure 2E:
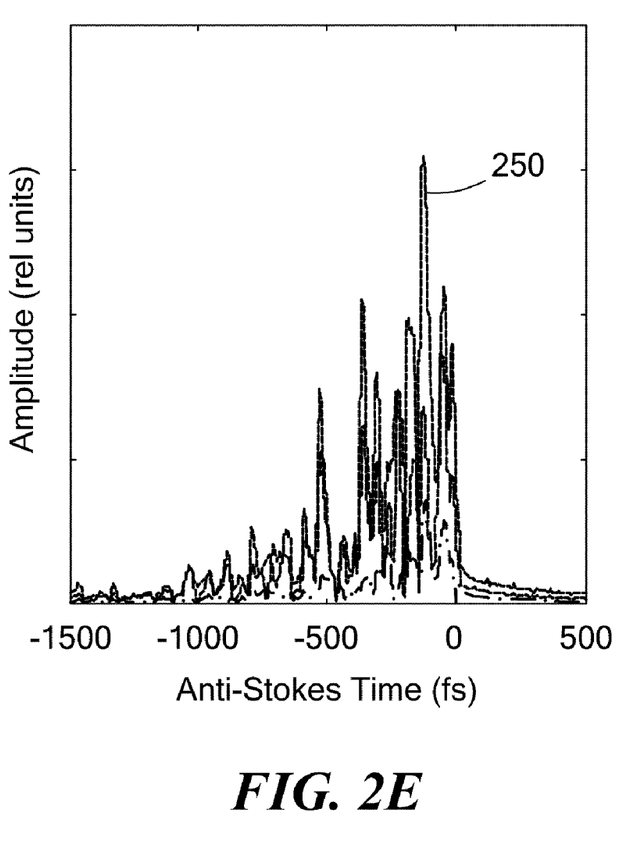
FIG. 2E is the amplitude of the anti-Stokes signal from each molecule.
Figure 2F:
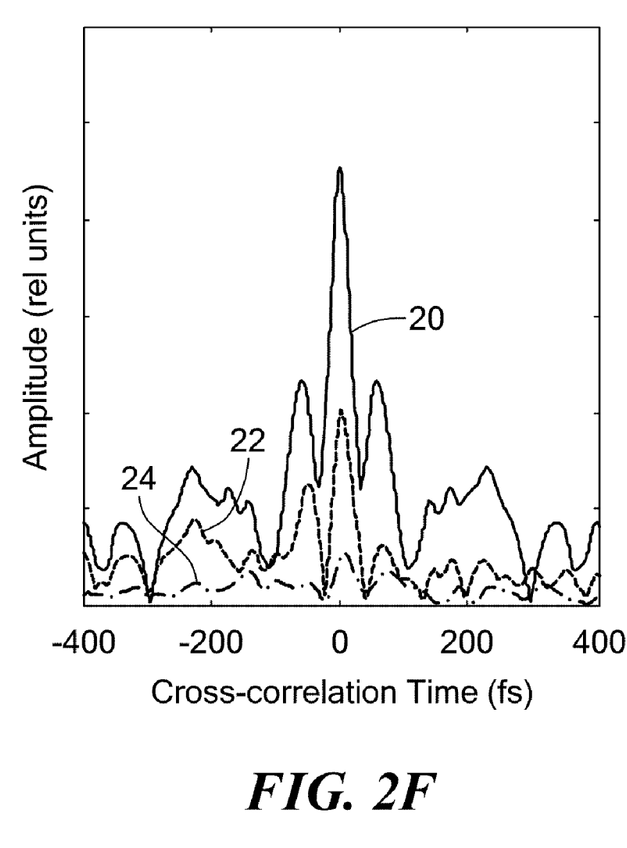
FIG. 2F is the amplitude of the cross-correlation of the anti-Stokes signal of each molecule with the target molecule anti-Stokes signal.

The results of this simulation are shown in FIGS. 2A-2F. As seen in FIGS. 2A and 2C, the iterative algorithm finds a pulse conforming to the source spectrum and the Raman spectrum of the target. FIG. 2C shows the magnitude of the Raman spectrum 202 of the molecule, and the achieved spectrum 201 derived by the iterative method. Examining FIG. 2C, the deviation from the target spectrum occurs at low frequencies because of the distortion introduced by W(t). FIG. 2D, in which vibrational polarization is induced in the three molecules (the target, confounder A and confounder B), shows that the greatest polarization occurs for the target molecule, represented by the dark curve 240 at a time delay offset of Δt=0 as expected. Less polarization occurs for CB which shares only two resonance frequencies with the target, and little occurs for CA (the lowest curve, 242. FIG. 2E shows the magnitude of the anti-Stokes signal scattered by each molecule, where the upper, dark curve 250 is, again, that of the target molecule. Because the total emitted anti-Stokes power is proportional to molecular concentration squared, the relevant quantity for distinguishing the concentration of a target from a confounder by power measurements is $$\sqrt{\frac{P}{P_T}}$$

where P and $P_T$ are the total power emitted by a confounder and the target respectively at the same concentration. This ratio $$\sqrt{\frac{P}{P_T}}$$

for CA is 0.204 and for CB is 0.622. Finally, FIG. 2F depicts the cross-correlation between the anti-Stokes signal of each molecule and the target molecule. At Δt=0, the amplitude of the cross-correlation of CA 24 relative to the target molecule 20 is 0.104, while the amplitude of CB 22 is 0.438 of the target, so that interferometric detection better rejects CB than the power measurement because the interferometric measurement utilizes the temporal shape of the anti-Stokes signal.

While a matched pulse is typically designed to produce constructive interference between vibrating normal modes in the target, it does not necessarily maximize the total anti-Stokes signal from the target, or best reject signals from particular confounders. There are many choices of pulse E(t) that conform to an envelope A(t) and the source spectrum. The pulse in this simulation was selected by examining one hundred pulses and selecting the pulse that best rejected CB. An approach based on quadratic programming or nonlinear optimization techniques may provide a way to select an optimal matched pulse for rejecting confounders.

The term "matched pulse" may refer to any and all embodiments of the present invention described herein and to such variations and modifications as lie within the scope of the invention.

To evaluate the performance of this technique, we compare the ratios of the amplitudes of the anti-Stokes cross-correlations to the cross-correlations of the Raman susceptibilities themselves given by $$\rho = \left| \frac{\int_{-\infty}^{\infty} dt \chi_C(t) \chi_T(t)}{\int_{-\infty}^{\infty} dt \chi_T(t)^2} \right| \quad (9)$$

where $\chi_C(t)$ and $\chi_T(t)$ are the Raman impulses of a confounder and the target, respectively. This ratio characterizes how well two signals can be separated using a linear matched filter rather than the CARS process. For CA, $\rho_A$=0.041 and for CB, $\rho_B$=0.511. Because we chose a pulse to deliberately reject CB, the matched pulse selectivity 0.438 actually does slightly better than the $\rho_B$ estimate. In general, ρ provides a reasonable estimate as to the potential performance of a matched pulse.

The microscope illumination and scanning practiced in accordance with the present invention may be the same configurations as specified in NIVI, including forwards and backwards scattering detection, and scanning of the beam using galvanometers and/or translation of the sample. Usually, tight focusing a high numerical aperture objective will be used to both focus the excitation radiation and collect the anti-Stokes radiation. For near infrared use, objectives suitable for NIVI and matched pulse illumination will commonly also be used for two-photon microscopy.

A Method of Designing the Pulse to Suppress the Signal Produced by a Strong Confounder For purposes of explication, it may be assumed that there exists a target molecule with a Raman impulse response $\chi_T(t)$ and confounders i from 1 to N with Raman impulse responses $\chi_i(t)$. In general, the pulse that produces an excitation in the target molecule will also produce an excitation in a confounder. If a confounder produces a strong signal, or is present in a much larger concentration than the target, the target may not be distinguishable in the presence of the confounder. If an application permits a reduction in the selectivity of the system, the pulse can be designed to eliminate signal produced by particular confounders. This can be done by choosing a pulse designed for a Raman impulse response $\chi'(t)$ rather than $\chi_T(t)$ such that $$\int_{-\infty}^{\infty} dt \chi'(t)\chi_i(t) = 0 \quad (10)$$

for all i which is of the form $$\chi'(t) = \chi_T(t) - \sum_{i=1}^{N} a_i \chi_i(t) \quad (11)$$

This can be achieved by the choice $$a = A^{-1} t \quad (12)$$

where a is a column vector with the $a_i$ as the elements, t is a column vector with the elements $$t_i = \int_{-\infty}^{\infty} dt \chi_i(t) \chi_T(t) \quad (13)$$

and $A^{-1}$ is the inverse of a matrix A with elements $A_{ij}$ given by $$A_{ij} = \int_{-\infty}^{\infty} dt \chi_i(t) \chi_j(t) \quad (14)$$

By subtracting out the contributions of confounders from the target impulse response, the excitation of vibrational frequencies common to the target and the confounders is eliminated, and more energy can be concentrated into vibrations that are unique to the target. Unfortunately, the remaining confounders that are not accounted for that also have vibrational frequencies in common with the target will produce a larger confounding contribution because fewer frequencies are used to distinguish the target from the confounders. However, this technique may be useful to screen out a few strong confounders.

It is finally noted that the low-frequency Raman vibrations of a molecule produce anti-Stokes radiation that may largely overlap the excitation radiation, so that low-frequency vibrations are less useful for molecular identification. As a result, it is likely desirable to bandpass the target molecule Raman impulse response $\chi_T(t)$ to only include normal mode frequencies that are at least 400 cm$^{-1}$ and above. Another useful modification to $\chi_T(t)$ is to remove any nonresonant component of the molecular response by setting $\chi_T(t)$ to zero for a short interval after zero (e.g. $\chi_T(t)=0$ for $t \leq 200$ fs).

Matched pulse Raman spectroscopy is a way to use knowledge of the Raman susceptibility of a molecule to engineer a pulse that drives normal modes into coherence, or to selectively correlate a reference beam with a scattering signal produced through a non-linear process. The techniques of the present invention may advantageously be applied to the detection and quantification of sugars, amino acids, and nucleotides of DNA, to cite merely several examples without limitation.

The present invention may be embodied in any number of instrument modalities. In alternative embodiments, the disclosed methods for pulse shaping for selective coherent excitation of vibrational modes may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In accordance with other embodiments of the invention, scatterers, such a gold nanoparticles, or otherwise, may be introduced into the sample, and, by shaping the incident pulse so that the field near the particle is matched to the chemical species of interest, much higher intensities than those of the incident field may be attained locally, by virtue of plasmon resonance, or otherwise. These and other variations and modifications are within the scope of the present invention as defined in any appended claims.

We claim:

1. A method for identifying the presence of a target molecular species in a sample, the molecular species characterized by a plurality of vibrational modes and a Raman impulse response, the method comprising:
   a. defining at least one feature of an exciting electromagnetic pulse on a basis of features of the Raman impulse response of the target species;
   b. exciting the sample with the electromagnetic pulse;
   c. generating coherent stimulated scattered radiation;
   d. interfering the coherent stimulated radiation with a reference pulse so as to cross-correlate the coherent stimulated radiation and the reference pulse, the reference pulse characterized by a relative timing with respect to the exciting electromagnetic radiation;
   e. shaping the reference pulse for selectively enhancing a correlation with scatter of the target species;
   f. sweeping the delay time so as to measure correlation as a function of delay time; and
   g. determining the presence of the target species based at least on a specified criterion applied to correlation as a function of delay time.

2. A method in accordance with claim 1, wherein the reference pulse is derived from the exciting electromagnetic pulse.

3. A method in accordance with claim 1, wherein the step of defining at least one feature of the exciting electromagnetic pulse includes defining a temporal aspect of the pulse.

4. A method in accordance with claim 1, wherein the step of defining at least one feature of the exciting electromagnetic pulse includes shaping an envelope of the pulse.

5. A method in accordance with claim 1, wherein the step of defining at least one feature of the exciting electromagnetic pulse includes defining an envelope amplitude aspect of the pulse.

6. A method in accordance with claim 1, wherein the step of defining at least one feature of the exciting electromagnetic pulse includes defining an envelope phase aspect of the pulse.

7. A method in accordance with claim 1, wherein the step of defining at least one feature of the exciting electromagnetic pulse includes defining a spectral aspect of the pulse.

8. A method in accordance with claim 1, wherein the step of defining at least one feature of the exciting electromagnetic pulse includes shaping the pulse in time to approximate a time-reversal of the Raman impulse response of the target species.

9. A method in accordance with claim 1, wherein the coherent stimulated scattering is anti-Stokes Raman scattering.

10. A method in accordance with claim 1, wherein the coherent stimulated scattering is Stokes Raman scattering.

11. A method in accordance with claim 1, wherein the exciting electromagnetic pulse is shaped to approximate a time-reversal of the Raman impulse response of the target species.

12. A method in accordance with claim 1, wherein the target species is used for generating the reference signal.

13. A method in accordance with claim 1, wherein the step of interfering the anti-Stokes scattered radiation with the reference beam further comprises filtering excitation wavelengths from at least one of the scattered radiation and the reference beam.

14. A method in accordance with claim 1, wherein the step of shaping includes a successive iteration process to achieve an intensity profile positive-definite in time.

15. A method in accordance with claim 1, wherein the step of shaping includes using a reference target sample to define the shape of the exciting electromagnetic pulse without an iterative algorithm.

16. A method in accordance with claim 1, wherein the step of shaping includes using a reference target sample in an environment corresponding to that of the sample to define the shape of the exciting electromagnetic pulse without an iterative algorithm.

17. A method in accordance with claim 1, further including introducing scatterers into the sample to enhance field intensities with respect to the target species.

18. An apparatus for identifying the presence of a target molecular species in a sample, the apparatus comprising:
   a. a source of ultrashort electromagnetic pulses;
   b. a pulse shaper for shaping pulses generated by the source in a manner exhibiting target species specificity;
   c. an interferometer for interfering pulses traversing a sample with reference pulses traversing a reference path;
   d. at least one detector for detecting a combination of pulses traversing the sample with reference pulses traversing the reference path;
   e. a correlator for determining the presence of the target species based at least on a specified criterion applied to correlation as a function of delay time; and
   f. a target sample disposed within the reference path.

19. An apparatus in accordance with claim 18, wherein the reference pulses are derived from the exciting electromagnetic pulse.

20. An apparatus in accordance with claim 18, further comprising a filter for filtering excitation wavelengths from at least one of radiation scattered by the sample and the reference pulses.

* * * * *